United States Patent
Sun et al.

(10) Patent No.: US 9,460,379 B2
(45) Date of Patent: Oct. 4, 2016

(54) RF TAG WITH RESONANT CIRCUIT STRUCTURE

(71) Applicant: Jingmeng Sun, Hong Kong (HK)

(72) Inventors: Jingmeng Sun, Hong Kong (HK); Bo Gao, Hong Kong (HK)

(73) Assignee: NEOID LIMITED (SHENZHEN), Shenzhen (CN)

( * ) Notice: Subject to any disclaimer, the term of this patent is extended or adjusted under 35 U.S.C. 154(b) by 0 days.

(21) Appl. No.: 14/983,626

(22) Filed: Dec. 30, 2015

(65) Prior Publication Data

US 2016/0217362 A1 Jul. 28, 2016

Related U.S. Application Data

(60) Provisional application No. 62/108,032, filed on Jan. 26, 2015.

(51) Int. Cl.
*G06K 19/06* (2006.01)
*G06K 19/077* (2006.01)

(52) U.S. Cl.
CPC ................................ *G06K 19/07749* (2013.01)

(58) Field of Classification Search
CPC .................... G06K 19/07749; G06K 19/0775
USPC .................... 235/492, 451; 340/572.7, 572.8
See application file for complete search history.

(56) References Cited

U.S. PATENT DOCUMENTS

| | | | |
|---|---|---|---|
| 7,405,664 B2 * | 7/2008 | Sakama | G06K 19/07756 156/250 |
| 2008/0252462 A1 * | 10/2008 | Sakama | G06K 19/07749 340/572.7 |
| 2011/0121079 A1 * | 5/2011 | Lawrence | G06K 19/07 235/488 |
| 2011/0180609 A1 * | 7/2011 | Sato | H01Q 1/2208 235/492 |

FOREIGN PATENT DOCUMENTS

| | | |
|---|---|---|
| CN | 101178783 A | 5/2008 |
| CN | 101248445 A | 8/2008 |
| CN | 101960471 A | 1/2011 |
| CN | 102467675 A | 5/2012 |
| WO | 2009022921 A1 | 2/2009 |

OTHER PUBLICATIONS

Search Report issued by the Chinese Patent Office on Aug. 28, 2015.
International Search Report of PCT Patent Application No. PCT/CN2015/100012 issued on Feb. 29, 2016.

* cited by examiner

*Primary Examiner* — Daniel St Cyr

(57) ABSTRACT

An RF tag includes a resonant circuit structure and an RF device. The resonant circuit structure includes: a first conducting layer; a second conducting layer spaced apart from the first conducting layer; at least one conducting base portion connecting one end of the first conducting layer and one end of the second conducting layer; and a layer of dielectric material inserted between the first conducting layer and the second conducting layer. Impedance of the resonant circuit structure is in match with impedance of the RF device. A slit is formed on the first conducting layer. The RF device is electrically coupled to the first conducting layer and disposed over the slit.

15 Claims, 26 Drawing Sheets

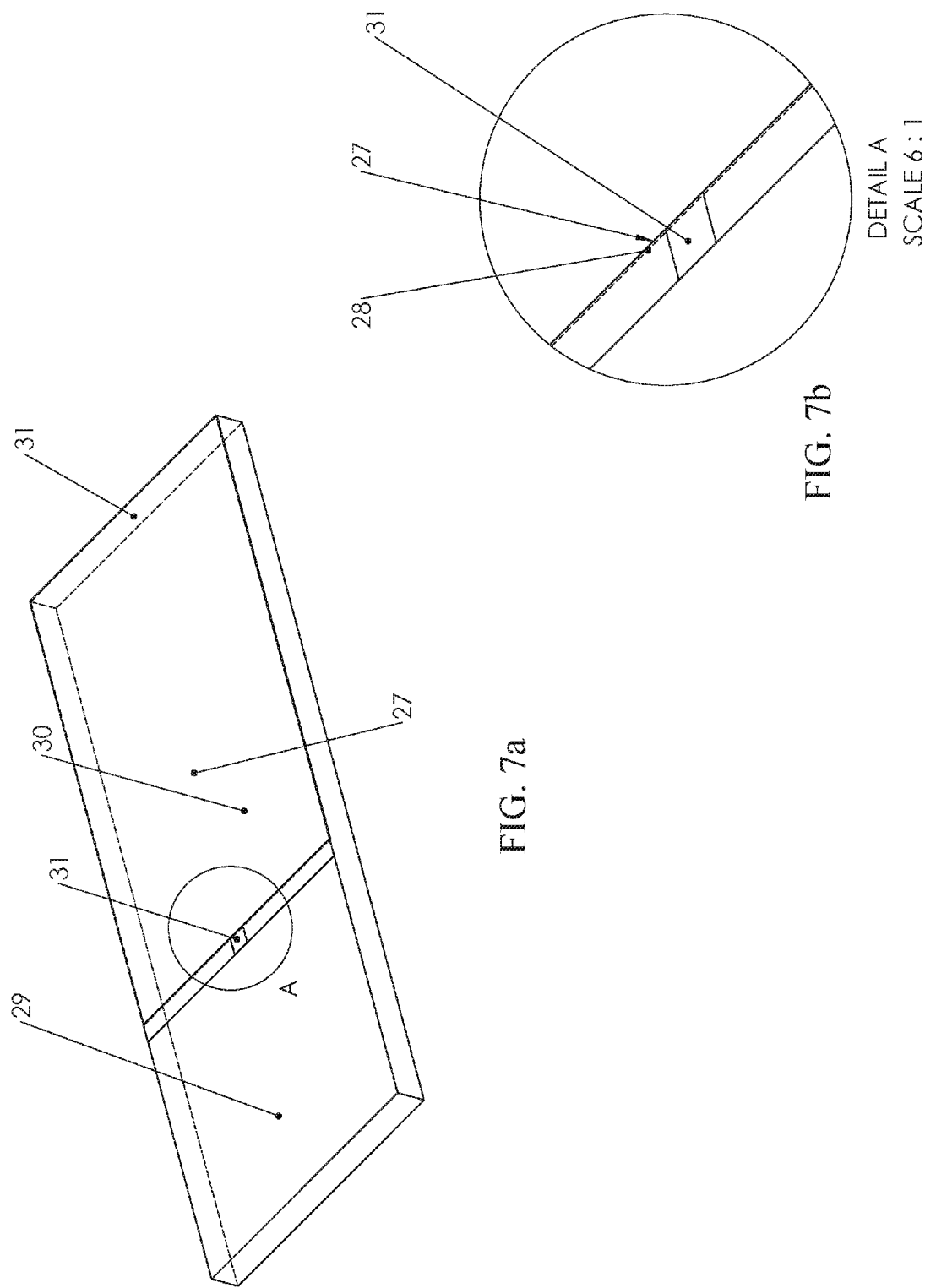

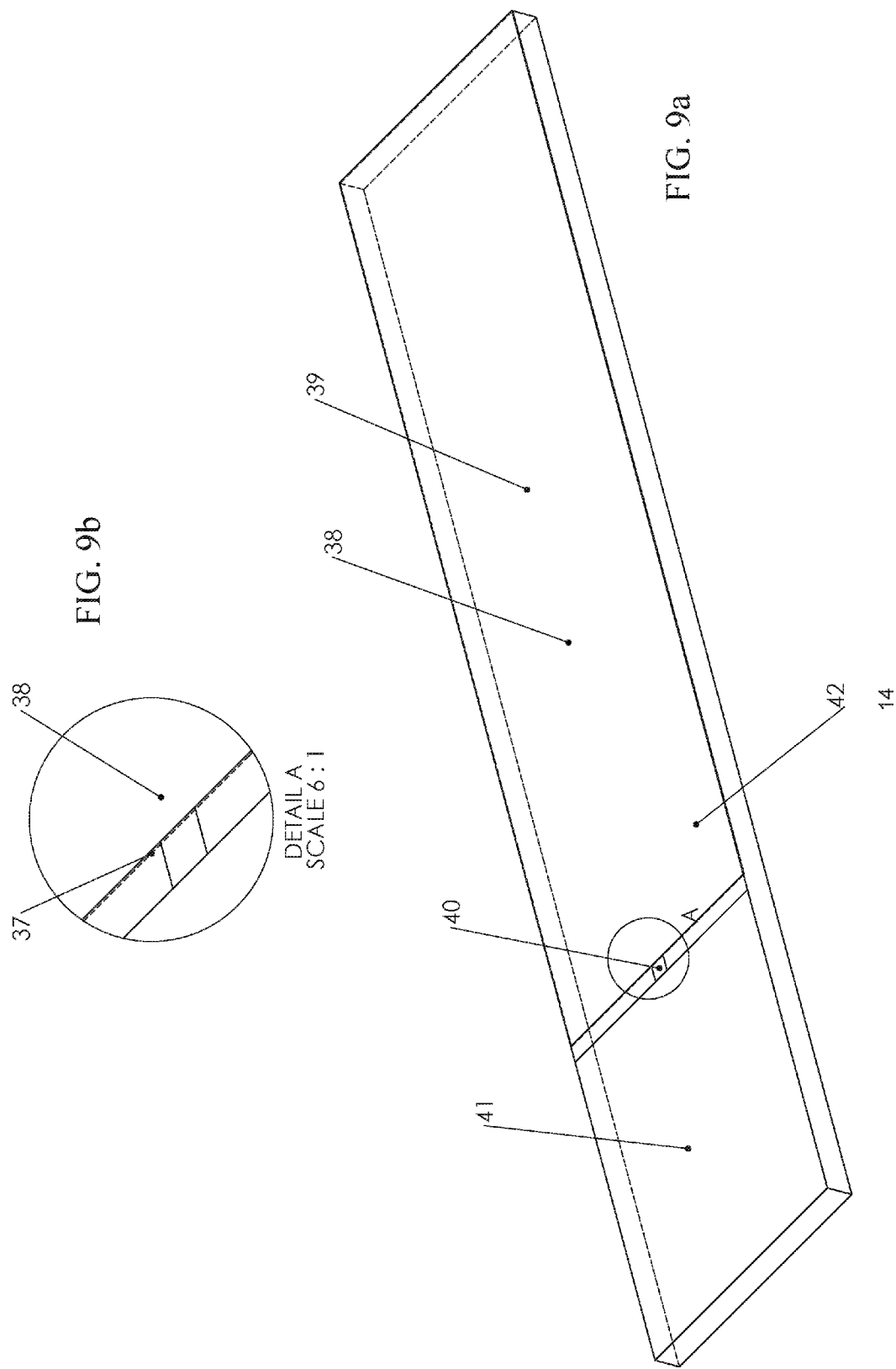

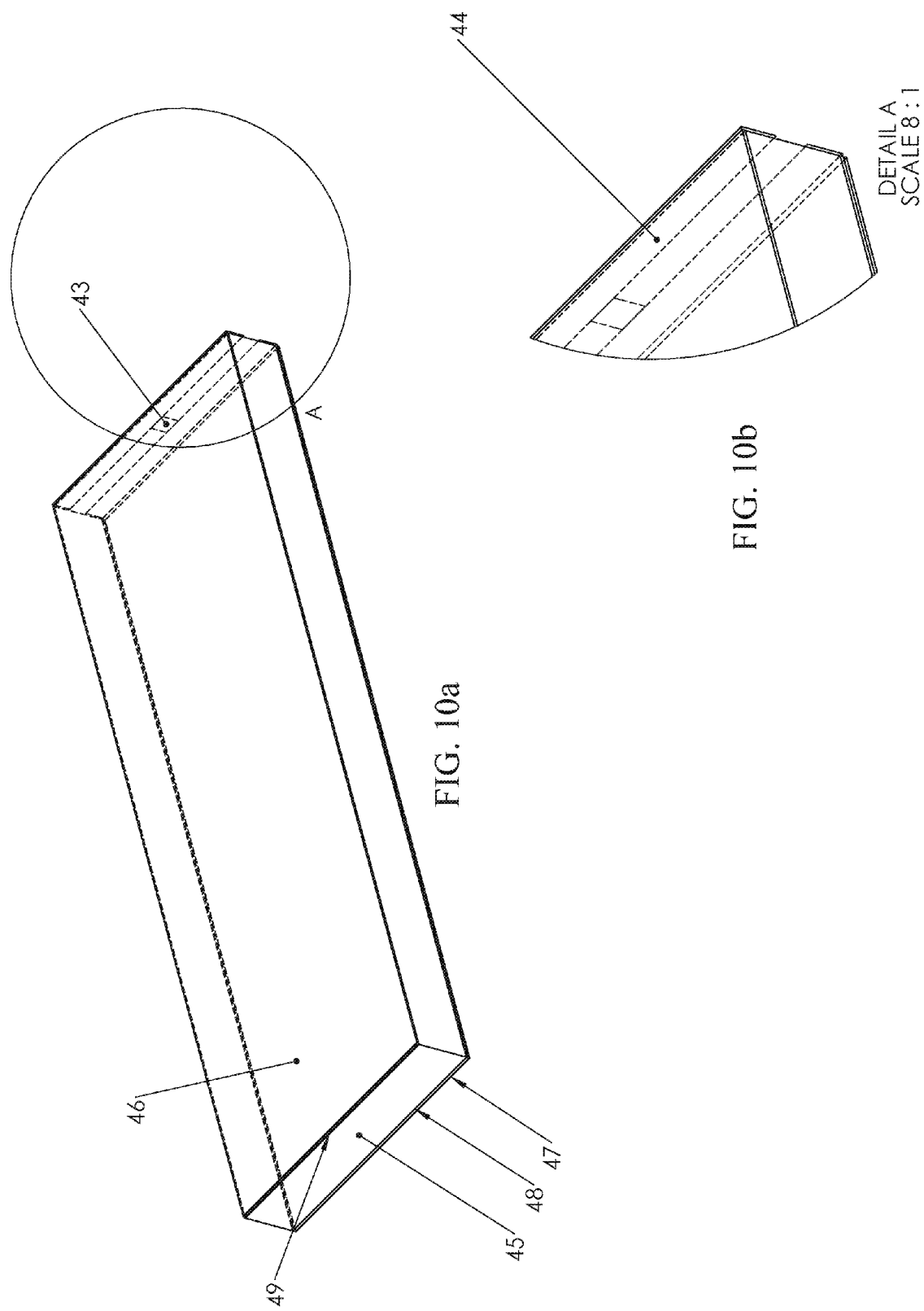

DETAIL A
SCALE 8 : 1

RF TAG WITH RESONANT CIRCUIT STRUCTURE

CROSS-REFERENCE TO RELATED APPLICATIONS

This application claims the benefit of U.S. non-provisional patent application No. 62/108,032 filed on Jan. 26, 2015; the contents of which is hereby incorporated by reference.

FIELD OF THE PATENT APPLICATION

The present patent application generally relates to RFID technologies and more specifically to a resonant circuit structure and an RF tag having the same that is capable of operating on metallic surfaces or embedded in metallic surfaces.

BACKGROUND

Electronic devices which can transmit a modulated electromagnetic signal that can be detected by a corresponding reader are widely used for identification and tracking of items, particularly for supply chain management, or item level product tracking. Such devices, which will be referred to as RF tags, include RF devices electrically connected to an antenna that is tuned to a particular frequency of operation, such as UHF (Ultra High Frequency) RFID (Radio Frequency Identification) tags, and Microwave RFID (Radio Frequency Identification) tags. The tags may be passive tags, which interact with reader by signal backscattering, semi-passive tags, which are powered by either their own power sources or external electromagnetic waves, or active tags, which are powered by its own power sources.

One disadvantage of these RF tags is that the reading range is reduced significantly when these tags are directly placed on a metallic surface. In a common case, the tags cannot be read. When the tags are placed close to the metallic surface at a distance less than $\lambda/4$, $\lambda$ being the wavelength at the frequency of operation of the RF tags, the RF tags' reading range will also be reduced. When RF tags are placed near or directly on a metallic surface, the surface current on the metallic surface will degrade the efficiency of RF tags. Therefore, the tracking of metallic objects is very difficult for UHF RF tags and Microwave RF tags, and more typically, passive RF tags.

Another disadvantage of these RF tags is that the RF tags are commonly designed for tracking RF friendly materials, such as paper, and low permittivity plastics. When these tags are placed on RF unfriendly materials, such as high permittivity materials, magnetic materials, and liquid, the reading range will also be reduced, more typically to an unacceptable level.

SUMMARY

The present patent application is directed to an RF tag. In one aspect, the RF tag includes a resonant circuit structure and an RF device. The resonant circuit structure includes: a first conducting layer; a second conducting layer spaced apart from the first conducting layer; at least one conducting base portion connecting one end of the first conducting layer and one end of the second conducting layer; and a layer of dielectric material inserted between the first conducting layer and the second conducting layer. Impedance of the resonant circuit structure is in match with impedance of the RF device. A slit is formed on the first conducting layer. The RF device is electrically coupled to the first conducting layer and disposed over the slit.

The RF tag may further include at least a magnetic material inserted between the first conducting layer and the second conducting layer. The RF tag may further include an RF device module being placed proximate to and capacitively coupled with the first conducting layer. The RF device module may include a first conducting island, a second conducting island, and the RF device. The distance between the second conducting island and the first conducting layer may be less than 0.1 mm.

The RF tag may further include a third conducting layer capacitively coupled with resonant circuit structure and electrically connected to the second conducting layer by the conducting base portion. The RF device may be electrically connected to the third conducing layer.

The RF tag may further include an additional conducting layer suspended between the first conducting layer and the second conducting layer. The additional conducting layer may be placed under the first conducting layer and overlapping with first conducting layer and the second conducting layer. The additional conducting layer may be electrically isolated from the first conducting layer and the second conducting layer. The impedance of the resonant circuit structure may be in conjugate match with the impedance of the RF device.

In another aspect, the present patent application provides an RF tag including a resonant circuit structure and an RF device. The resonant circuit structure includes: a first conducting layer; a second conducting layer spaced apart from the first conducting layer; and a layer of dielectric material inserted between the first conducting layer and the second conducting layer. Impedance of the resonant circuit structure is in match with impedance of the RF device. A slit is formed on the first conducting layer. The RF device is electrically coupled to the first conducting layer and disposed over the slit. The first conducting layer is connected to the second conducting layer by capacitive coupling.

The RF device may be placed over the resonant circuit structure spaced apart. The first and second conducting layers may form a continuous conducting layer made of a conductive material, and the continuous conducting layer may be folded over the layer of dielectric material.

In yet another aspect, the present patent application provides a RF tag comprising a resonant circuit structure and an RF device. The resonant circuit structure includes: a first conducting layer; a second conducting layer spaced apart from the first conducting layer; and at least one conducting base portion connecting one end of the first conducting layer and one end of the second conducting layer. Impedance of the resonant circuit structure is in match with impedance of the RF device. The first conducting layer is connected to the second conducting layer by capacitive coupling. The RF device is disposed on the conducting base portion and electrically coupled to the conducting base portion.

An RF device module may be placed over the first conducting layer and the second conducting layer. The RF tag may further include an additional conducting layer suspended between the first conducting layer and the second conducting layer. The additional conducting layer may be placed under the first conducting layer and overlapping with first conducting layer and the second conducting layer.

The additional conducting layer may be electrically isolated from the first conducting layer and the second conducting layer. The RF tag may include two conducting base portions. A slit may be formed on one conducting base portion, and the RF device may be disposed over the slit and electrically connected to the conducting base portion. The RF tag may further include a layer of dielectric material inserted between the first conducting layer and the second conducting layer.

BRIEF DESCRIPTIONS OF THE DRAWINGS

FIG. 1b is an equivalent schematic circuit diagram of the resonant circuit structure shown in FIG. 1a.

FIG. 2b is an equivalent schematic circuit diagram of the resonant circuit structure shown in FIG. 2a.

FIG. 3b is an equivalent schematic circuit diagram of the resonant circuit structure shown in FIG. 3a.

FIG. 4b is an equivalent schematic circuit diagram of the resonant circuit structure shown in FIG. 4a.

FIG. 5b is an equivalent schematic circuit diagram of the resonant circuit structure shown in FIG. 5a.

FIG. 7a illustrates a resonant circuit structure in accordance with still another embodiment of the present patent application.

FIG. 7b is a partial magnified view of FIG. 7a.

FIG. 8b is a partial magnified view of FIG. 8a.

FIG. 9a illustrates a resonant circuit structure in accordance with still another embodiment of the present patent application.

FIG. 9b is a partial magnified view of FIG. 9a.

FIG. 10a illustrates a resonant circuit structure in accordance with still another embodiment of the present patent application.

FIG. 10b is a partial magnified view of FIG. 10a.

FIG. 12b is a partial magnified view of FIG. 12a.

DETAILED DESCRIPTION

Reference will now be made in detail to a preferred embodiment of the RF tag with a resonant circuit structure disclosed in the present patent application, examples of which are also provided in the following description. Exemplary embodiments of the RF tag with a resonant circuit structure disclosed in the present patent application are described in detail, although it will be apparent to those skilled in the relevant art that some features that are not particularly important to an understanding of the RF tag with a resonant circuit structure may not be shown for the sake of clarity.

Furthermore, it should be understood that the RF tag with a resonant circuit structure disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1A:
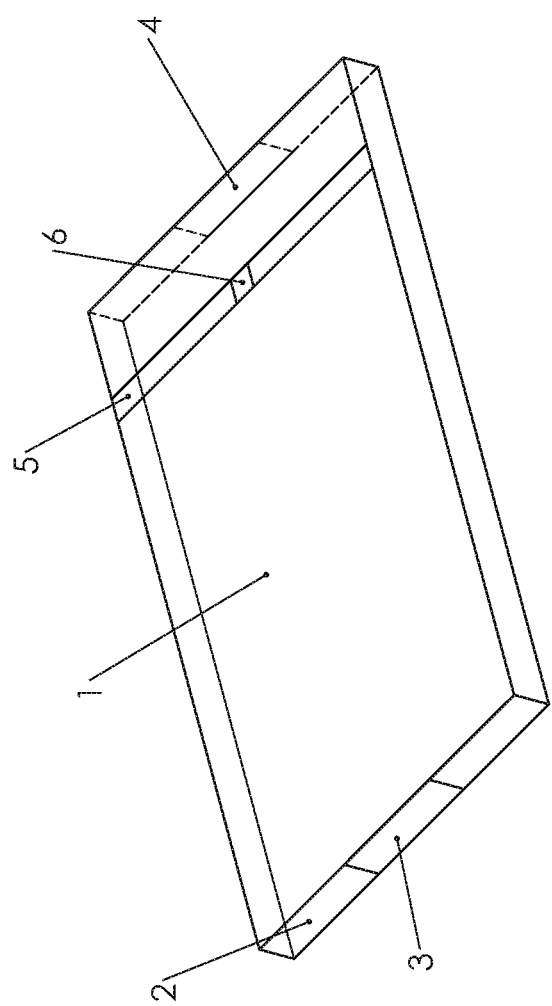
FIG. 1a shows a perspective view of an RF tag according to an embodiment of pending patent U.S. application Ser. No. 13/008,030.

FIG. 1a shows a perspective view of an RF tag according to an embodiment of pending patent application U.S. application Ser. No. 13/008,030. Referring to FIG. 1a, the RF tag includes a resonant circuit structure that includes a layer of metal forming a first conducting layer 1 and a second conducting layer 2 spaced apart from the first conducting layer 1. These two layers are in parallel and connected by two conducting base portions 3, 4. There may be a layer of dielectric material inserted between the first conducting layer 1 and the second conducting layer 2, which may be air, or more than one layer of dielectric material. There may also be one or multiple layers of magnetic material inserted between the first conducting layer 1 and the second conducting layer 2, which may be ferrite. A slit 5 is formed on the first conducting layer 1, which divides the first conducting layer 1 into two islands spaced apart from each other. The RF tag further includes an RF device 6. The RF device 6 may be electrically connected to the first conducting layer 1 and disposed over the slit 5.

Figure 1B:
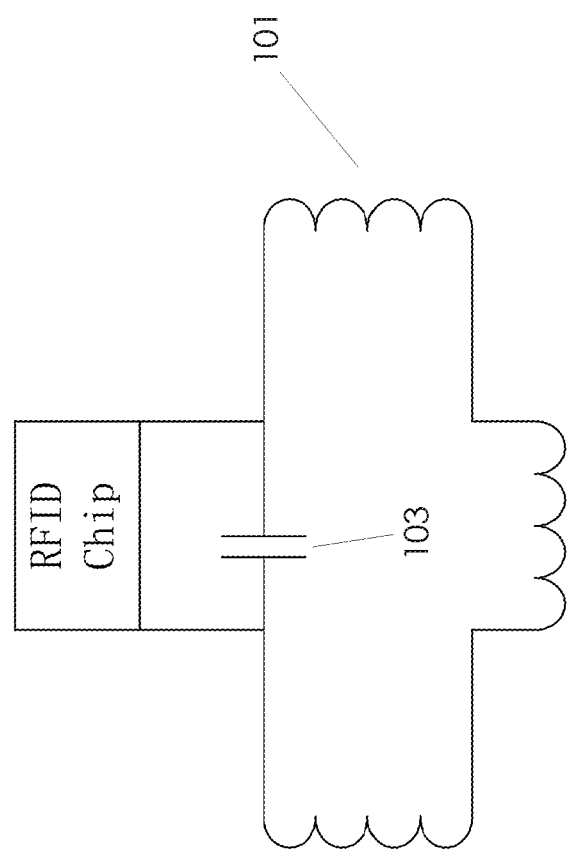

FIG. 1b is an equivalent schematic circuit diagram of the resonant circuit structure shown in FIG. 1a. Referring to FIG. 1b, it is convenient to consider a simple model, in which the first conducting layer 1, the second conducting layer 2, and two conducting base portions 3 and 4 are regarded as inductors, and the slit 5 on the first conducting layer 1 acts as a capacitor 103. The resonant circuit structure acts to suppress surface waves at the metallic surface. When the impedance of the resonant circuit structure is in match with the impedance of the RF device 6, preferably in conjugate match, the maximum power will be transferred to the RF device 6.

Figure 2A:
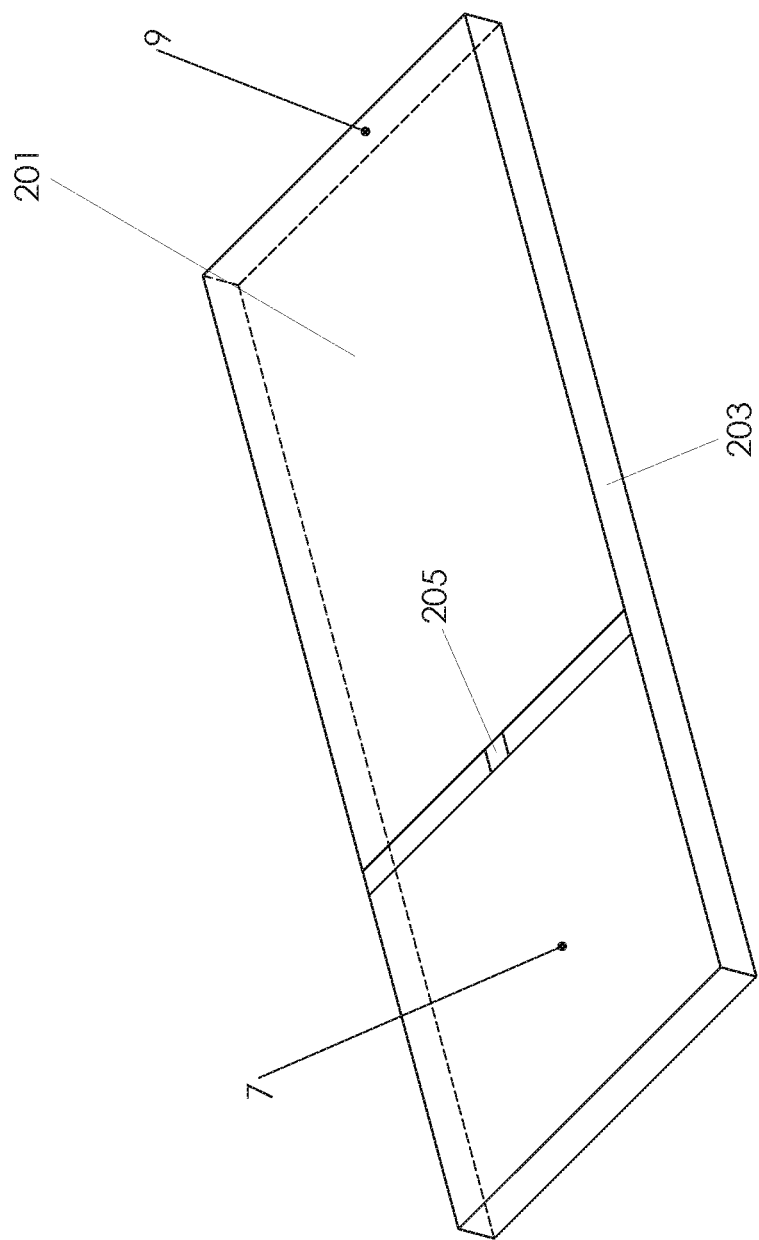
FIG. 2a shows a resonant circuit structure in accordance with an embodiment of the present patent application.

FIG. 2a shows a resonant circuit structure in accordance with an embodiment of the present patent application. The embodiment of FIG. 1a includes two conducting base portions 3 and 4 connecting the first conducting layer and the second conducting layer. Here in this embodiment, there is only one conducting base portion 9 connecting a first conducting layer 201 and a second conducting layer 203, and the length of the first conducting layer 201 is longer than the first conducting layer 1 in FIG. 1a. The island 7 of the first conducting layer and the second conducting layer can be thought of as a capacitor with dielectric materials between them.

Figure 2B:
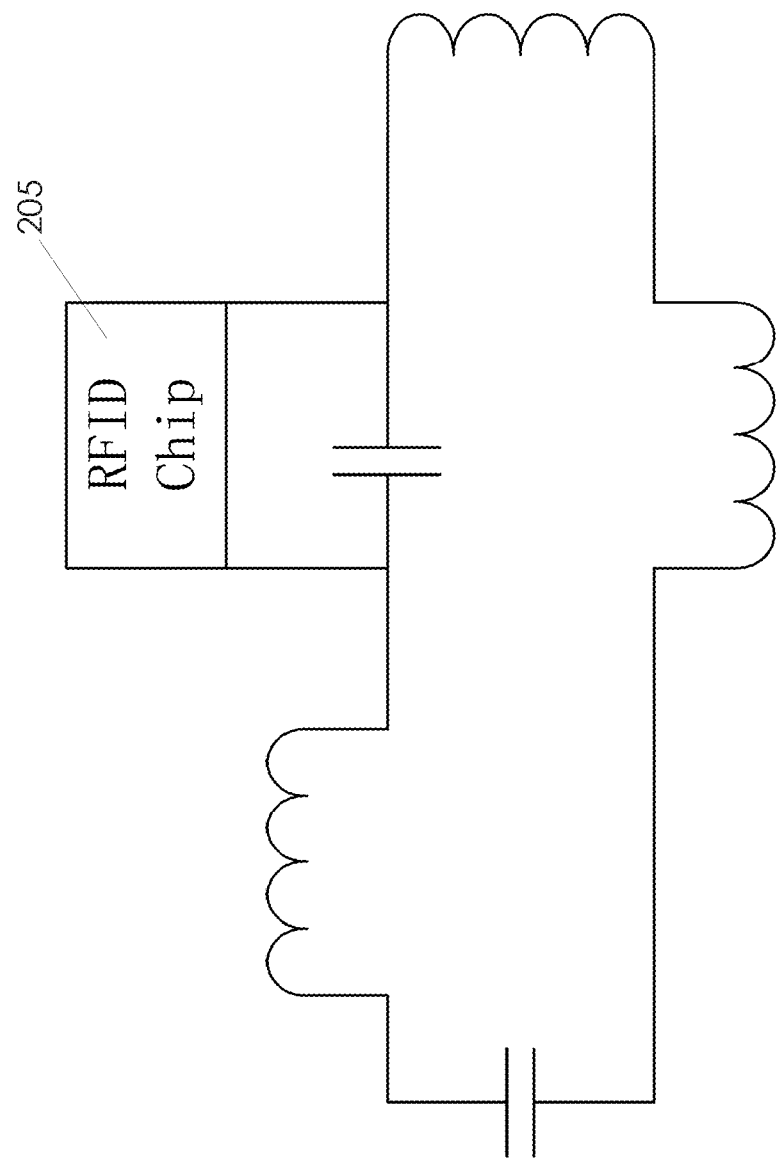

FIG. 2b shows an equivalent circuit model of FIG. 2a. Referring to FIG. 2b, the induced capacitance by island 7 can be used to get the resonant circuit structure to match with an RF device 205. Thus for a given frequency and an RF device 205, the resonant circuit structure of FIG. 2a result in a similar result with the resonant circuit structure shown in FIG. 1a. Nevertheless, such one conducting base portion resonant circuit structure's manufacturing cost can be lower than the structure in FIG. 1a.

Figure 3A:
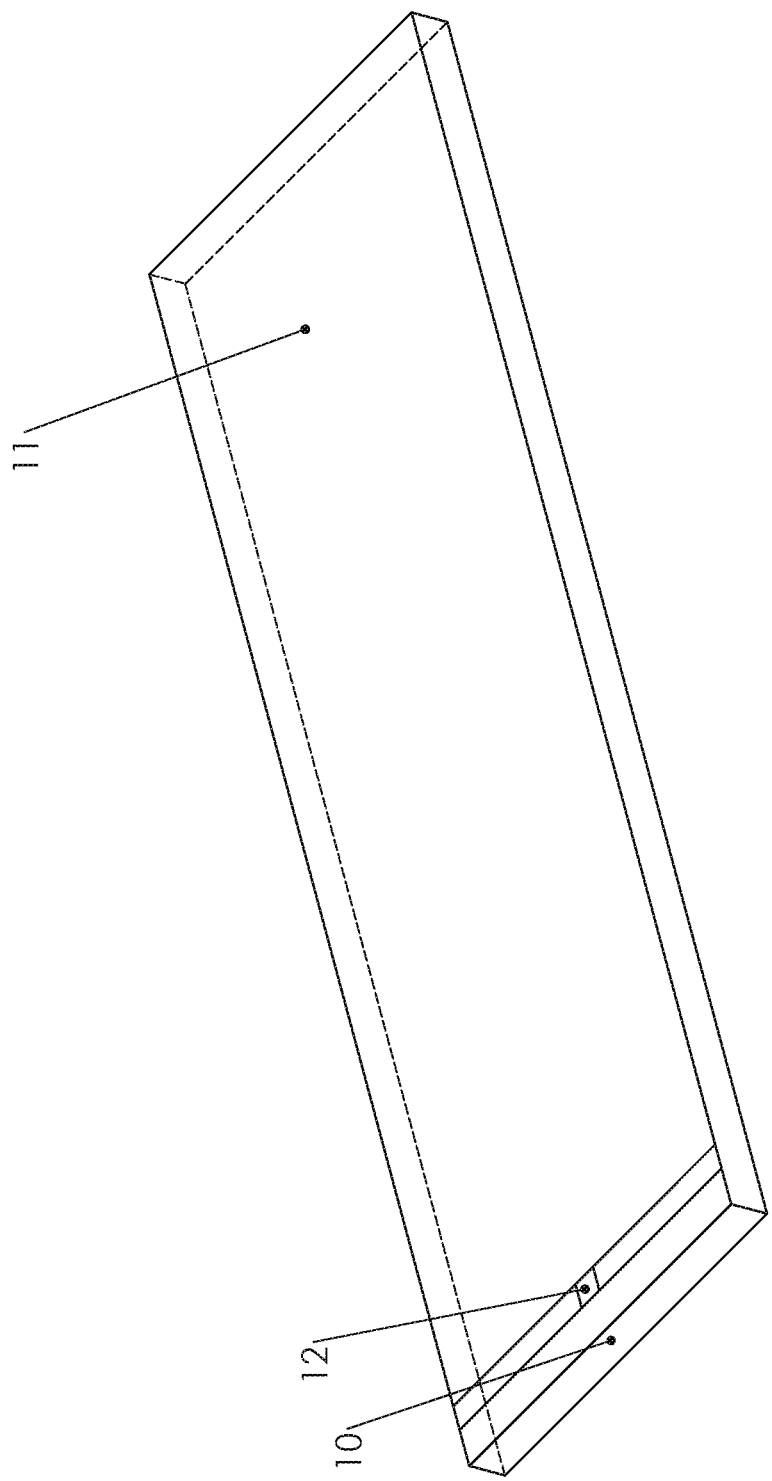
FIG. 3a shows a resonant circuit structure in accordance with another embodiment of the present patent application.

FIG. 3a shows a resonant circuit structure in accordance with another embodiment of the present patent application. Referring to FIG. 3a, the resonant circuit structure includes only one conducting base portion 10, which is near to an RF device 12 and the island 11 is modeled as a capacitor. It can be seen that the resonant circuit structures of FIG. 3a and FIG. 2a are similar.

In the above embodiments, the resonant circuit structure has only one conducting base portion connecting the first conducting layer and the second conducting layer. FIG. 4 and FIG. 5 illustrate embodiments having no conducting base portions.

Figure 4A:
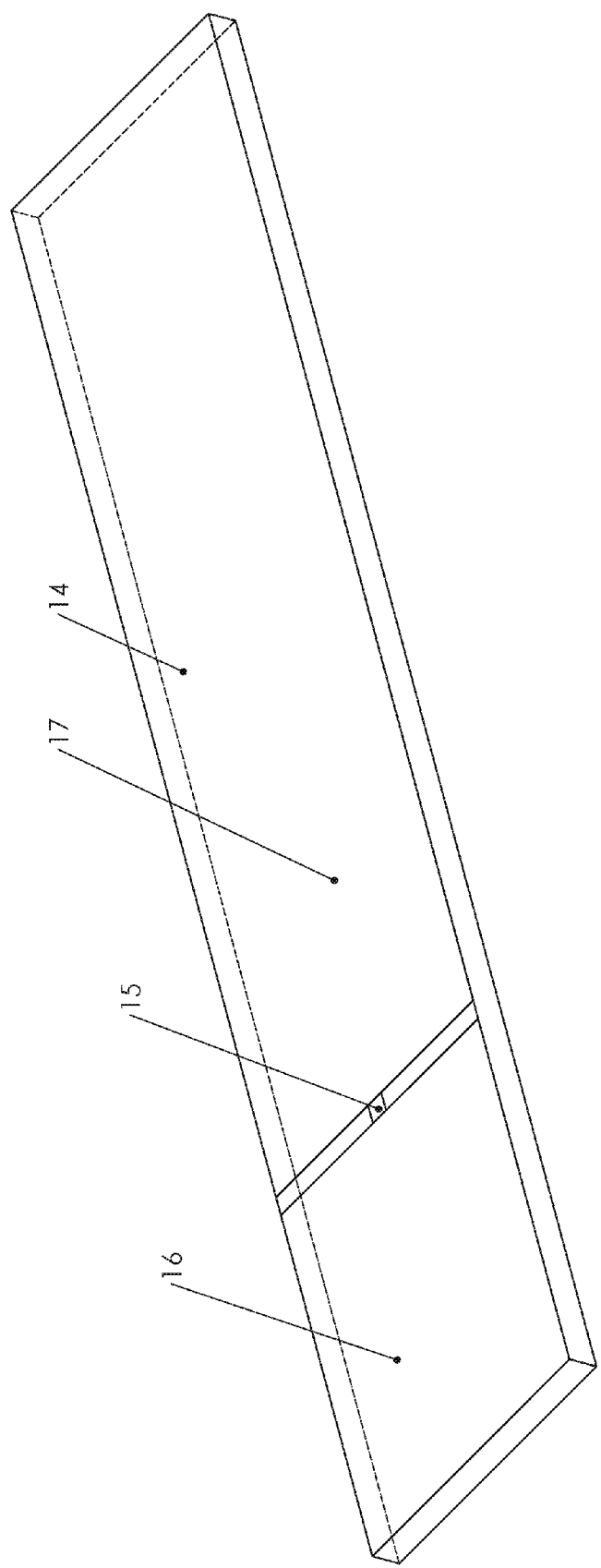
FIG. 4a illustrates a resonant circuit structure in accordance with yet another embodiment of the present patent application.
Figure 4B:
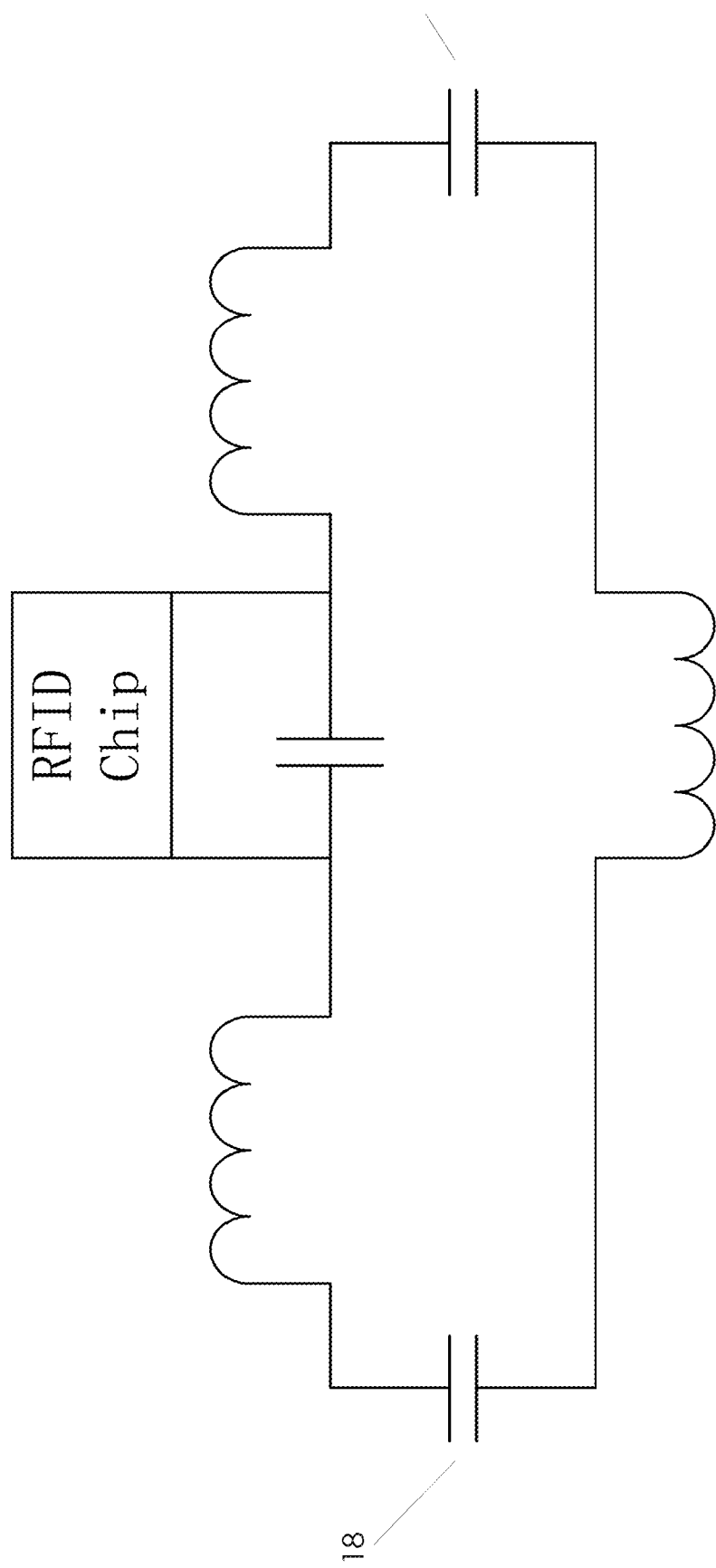

FIG. 4a illustrates a resonant circuit structure without conducing base portions connecting the first conducting layer and the second conducting layer in accordance with yet another embodiment of the present patent application. FIG. 4b is an equivalent schematic circuit diagram of the resonant circuit structure shown in FIG. 4a. Referring to FIG. 4a and FIG. 4b, the island 16 and the second conducing layer 17 form capacitor 18, while the island 14 and the second conducting layer 17 form capacitor 19, causing an equivalent circuit model of FIG. 4b where capacitor 18 and capacitor 19 replace the two conducting base portions in FIG. 1b. The formation of the capacitor 19 can be seen as two individual parts compared with FIG. 1a. The island 17 is longer than the island 1 of FIG. 1. The longer part of island 17 and the second conducting layer can be seen as a capacitor, which connects the first conducting layer to the second conducting layer by capacitive coupling.

Figure 5A:
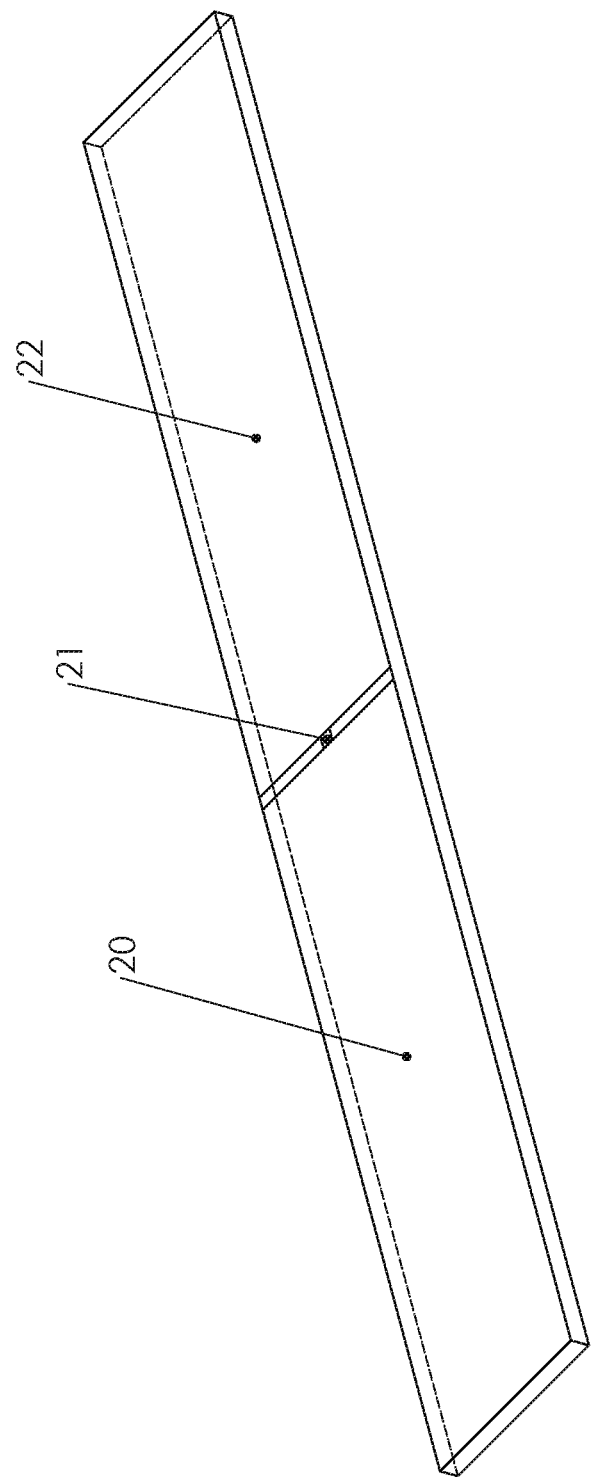
FIG. 5a illustrates a resonant circuit structure in accordance with still another embodiment of the present patent application.
Figure 5B:
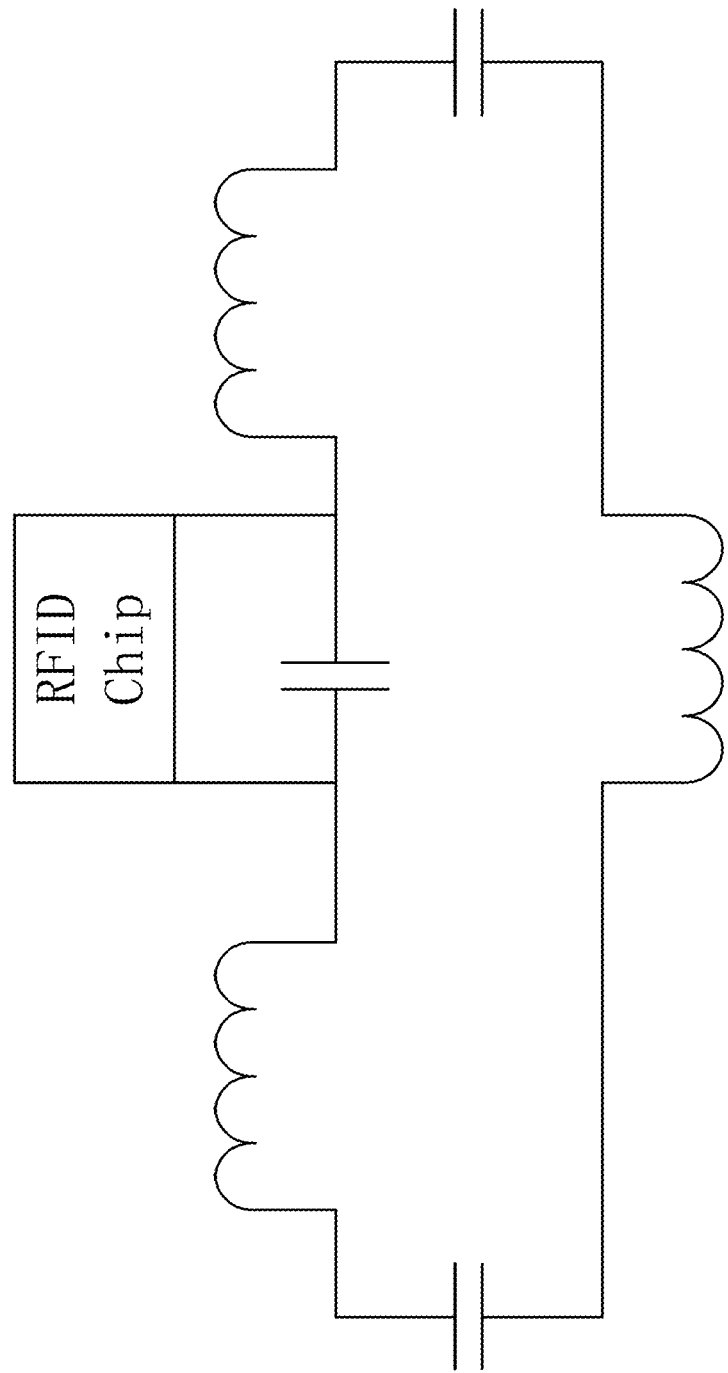

A larger structure arrangement is shown in FIG. 5a. Here the island 20 and island 22 are of the same size. The island 20 and island 22 introduce capacitance to form a resonant circuit structure as shown in FIG. 5b. These structures therefore act as a resonant circuit structure as described in FIG. 1, FIG. 2, and FIG. 3.

Figure 3B:
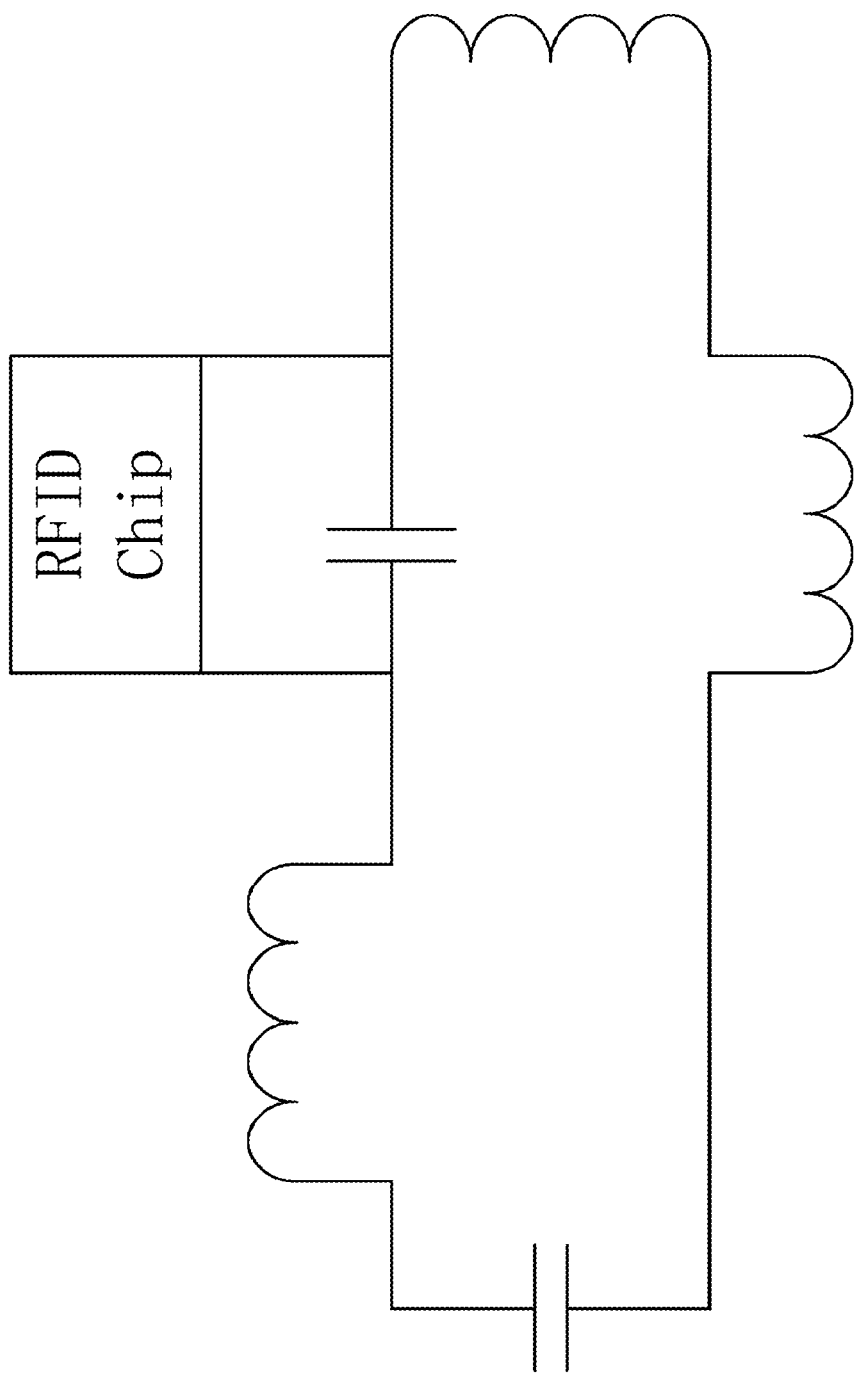
Figure 6:
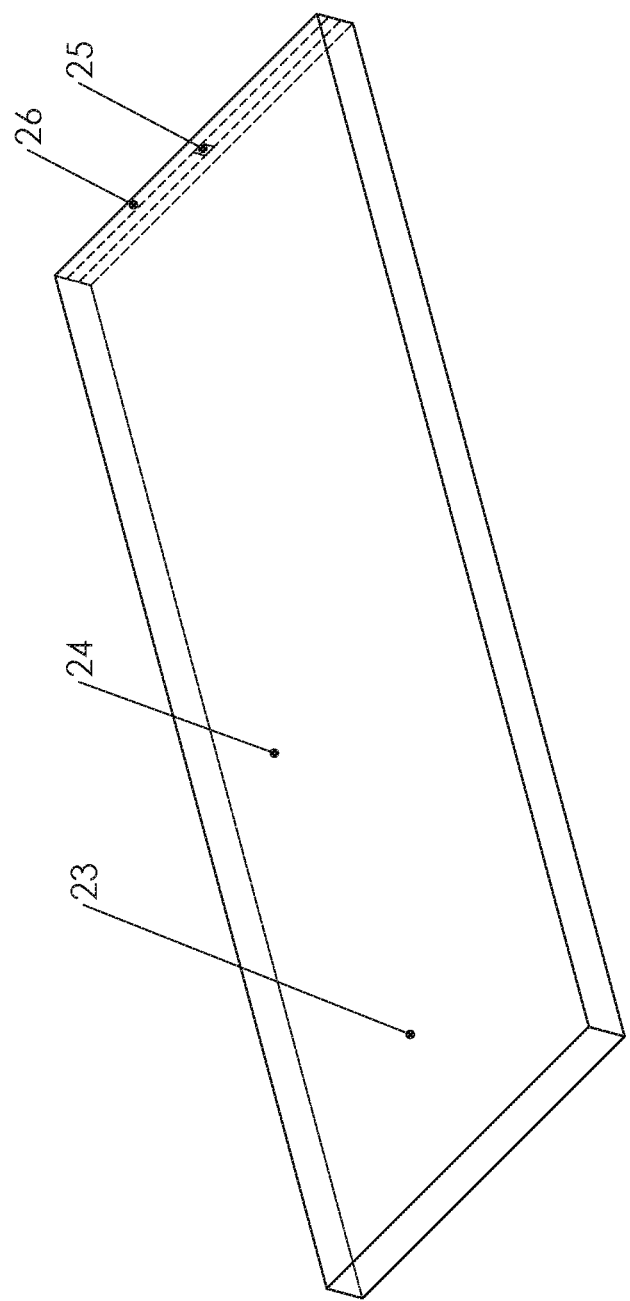
FIG. 6 illustrates a resonant circuit structure in accordance with still another embodiment of the present patent application, where the RF device is placed on the base portion.

FIG. 6 shows an alternative embodiment of FIG. 3, where the RF device 25 is placed on one conducting base portion 26. The island 23 and the second conducting layer 24 act as a capacitor, which connecting the first conducting layer to the second conducting layer by capacitive coupling. This RF device placement reduces the size of RF tag by a little. Since the fragile RF device 25 is placed on the conducting base portion 26, the RF device 25 would not be destroyed by forces on the direction perpendicular to the surface of conducting layers.

FIG. 7a shows another embodiment of the present patent application in which an RF device module 27 is placed proximate to the first conducting layer 28 as illustrated in FIG. 7b. FIG. 7b is a partial magnified view of the RF device module 27 as depicted in FIG. 7a. Referring to FIG. 7a and FIG. 7b, the RF device module 27 includes a conducting island 29, a conducting island 30, and an RF device 31. It is convenient to consider a simplistic model of the capacitive coupling between the RF device module 27 and the resonant circuit structure. The RF device module 27 will not function in free space, for instance, in the UHF (Ultra High Frequency) band. The conducting island 30 of the RF device module 27 is not electrically connected but capacitively coupled with the first conducting layer 28 in this embodiment. Since the distance between conducting island 30 and the first conducting layer 28 is very small, for instance, less than 0.1 mm, the capacitance is large and the detuning of the resonant structure is relatively small. The conducting island 29 and the second conducting layer act as a capacitor of the resonant circuit structure. It can be seen that the structure is similar to the structure in FIG. 2.

The RF device module 27 is placed above resonant circuit structure and it is connected to the resonant circuit structure by capacitive coupling, as shown in FIG. 7a and FIG. 7b. It is also possible to create an RF tag, which includes the RF device module and resonant circuit structures, with one conducting base portion or no conducting base portions, as shown in FIGS. 8a, 8b, 9a and FIG. 9b. This has the same theory with the model of FIG. 7.

Figure 8B:
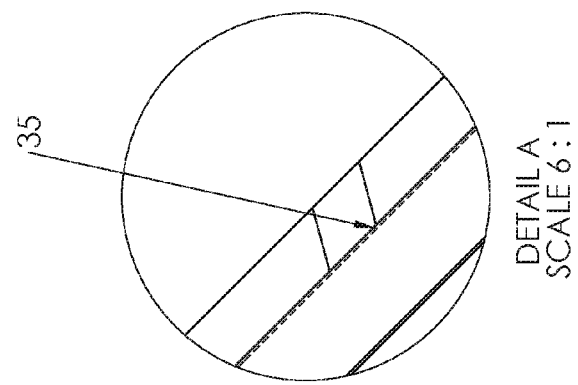
Figure 8A:
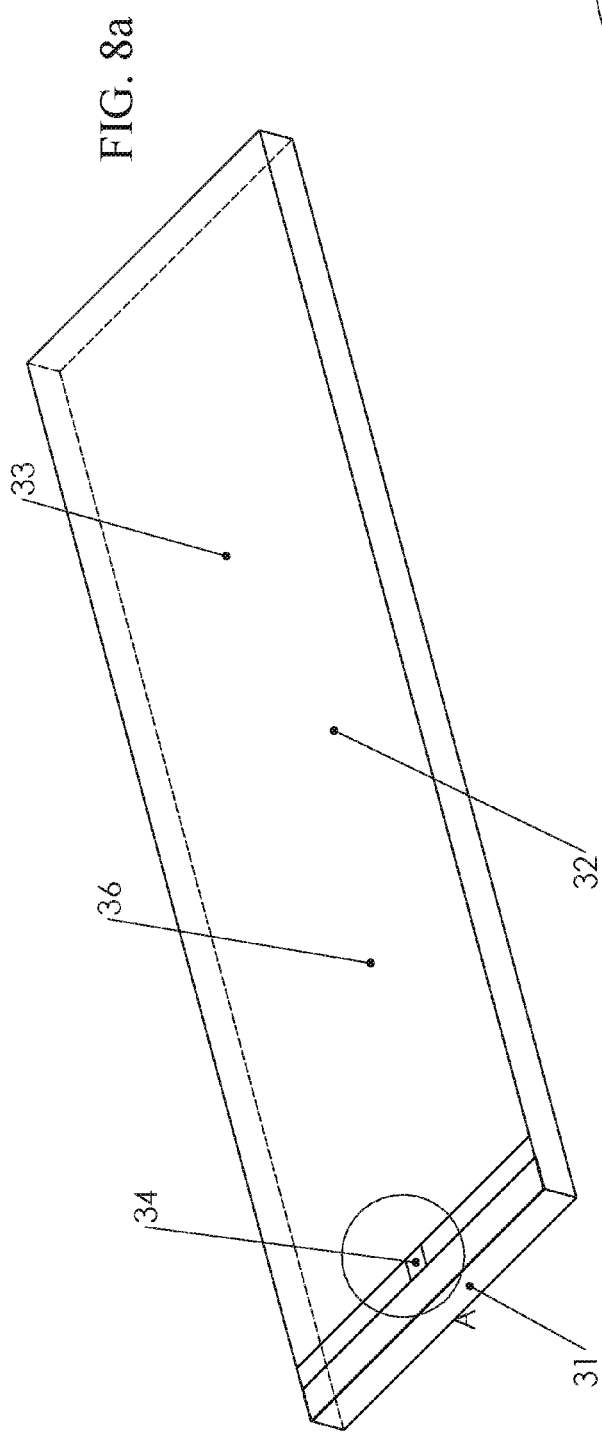
FIG. 8a illustrates a resonant circuit structure in accordance with still another embodiment of the present patent application.

Referring to FIGS. 8a and 8b, an RF device 34 is electrically connected to a third conducting layer 36. The third conducting layer 36 is capacitively coupled with resonant circuit structure 35. At one end, the part of the conducting layer 36, island 33 forms a capacitor with the second conducting layer 32. At the other end, the conducting layer 36 is electrically connected to the second conducting layer by a conducting base portion 31. The resonant circuit structure is formed by the capacitor, conducting base portion, and two conducting layers.

Another implementation is based on FIG. 4, referring to FIGS. 9a and 9b, where the resonant circuit structure has no conducting base portion. The RF device module 38, which includes the RF device 40, is placed over the resonant circuit structure 37 spaced apart. The resonant circuit structure is formed by two capacitors. One is formed by the conducting island 39 and the second conducting layer 42, and the other is formed by the conducting island 41 and the second conducting layer 42. Although there is no conducting base portion connecting the first conducting layer and the second conducting layer, the first conducting layer and second conducting layer can be connected by capacitive coupling and the impedance of the resonant circuit structure can be tuned to match with RF device's impedance.

An alternative approach is employed in FIGS. 10a and 10b with the RF device module being placed over the first conducting layer 49 and the second conducting layer 48. The conducting islands of RF device module 46 and 47 are capacitively coupled with the first conducting layer 49 and the second conducting layer respectively. The RF device 43 is placed at the other end of the conducting base portion 45 of the resonant circuit structure.

The self-resonance of the resonant circuit structure at certain frequency, for instance UHF (ultra-high frequency) band, will forbid the surface wave when placed on metallic surface. Therefore, the radiation gain of the resonant circuit structure will be high and the read range of RF tag will be long.

Figure 11A:
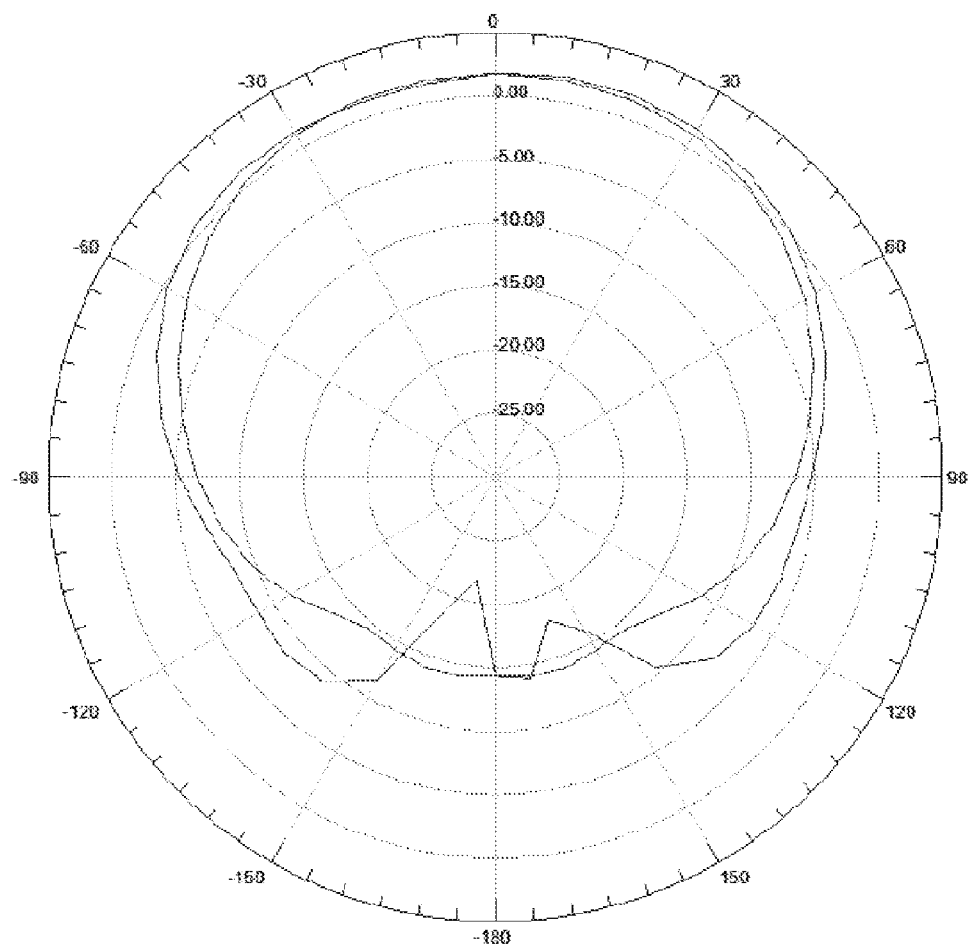
FIG. 11a shows a radiation gain pattern of an RF tag having the resonant circuit structure illustrated in FIG. 10 when placed on a metal surface.
Figure 11B:
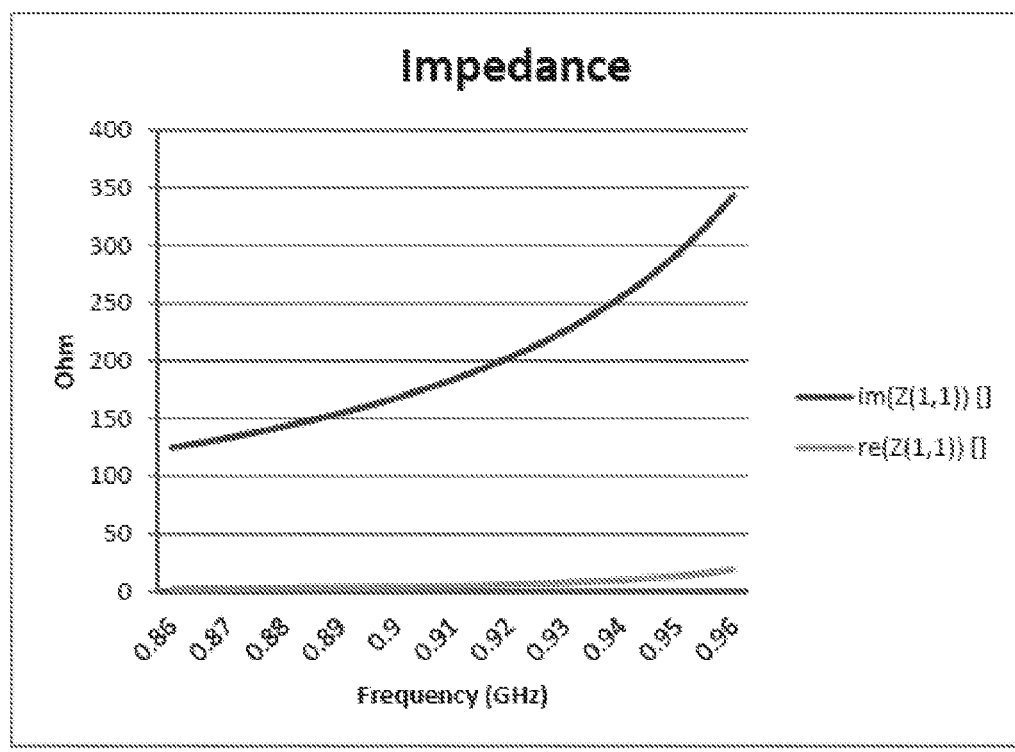
FIG. 11b shows an impedance pattern of the RF tag having the resonant circuit structure illustrated in FIG. 10 when placed on a metal surface.

FIG. 11a shows a radiation gain pattern of an RF tag having the resonant circuit structure illustrated in FIG. 10 when placed on a metal surface. FIG. 11b shows an impedance pattern of the RF tag having the resonant circuit structure illustrated in FIG. 10 when placed on a metal surface. The radiation gain on the metal surface is around 3 dBi. It is noted that the impedance of the resonant circuit structure is matched with the RF device 43, which is a UHF RFID chip in this case. To maximize the power transferred from the resonant circuit structure to the RFID chip, the return loss between the RFID chip and the resonant circuit structure should be minimized. The return loss between the resonant circuit structure and the RFID chip is:

$$|S|^2 = |Z_L - Z^*_S / Z_L + Z_S|^2, 0 \leq |S|^2 \leq 1,$$

where $Z_L$ is the antenna (the resonant circuit structure) impedance and $Z_S$ is the RFID chip impedance.

Figure 11C:
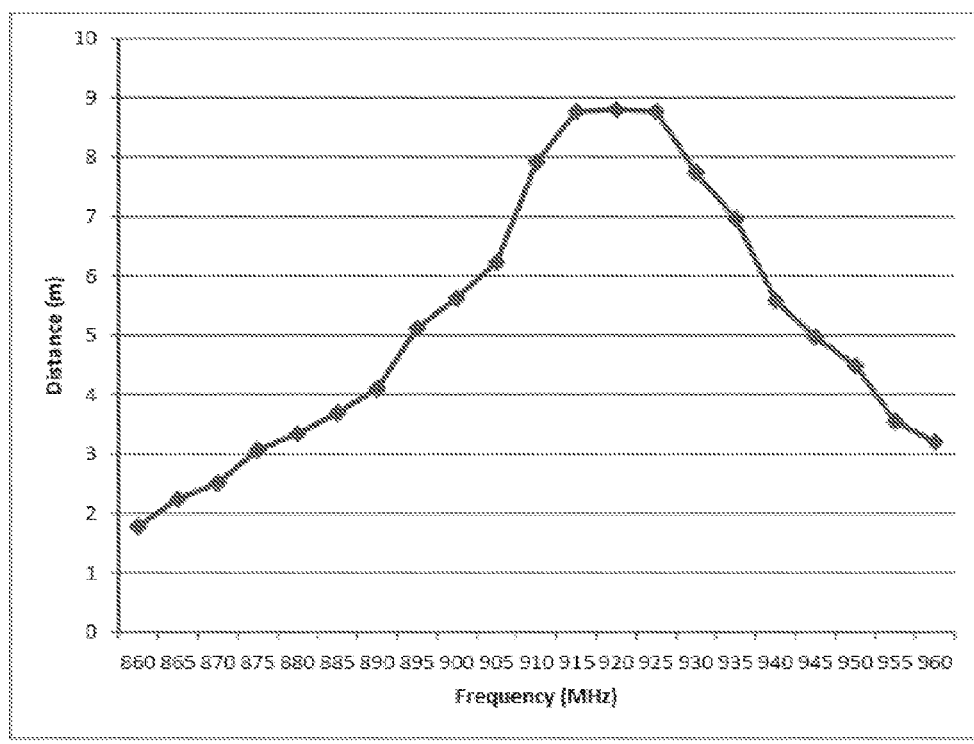
FIG. 11c shows a measured read range of the RF tag having the resonant circuit structure illustrated in FIG. 10 when placed on a metal surface.

FIG. 11c shows a measured reading range of the RFID (Radio Frequency Identification) tag according to this embodiment on a metallic surface. The maximum reading range at 920 MHz is around 9 meters.

Figure 12A:
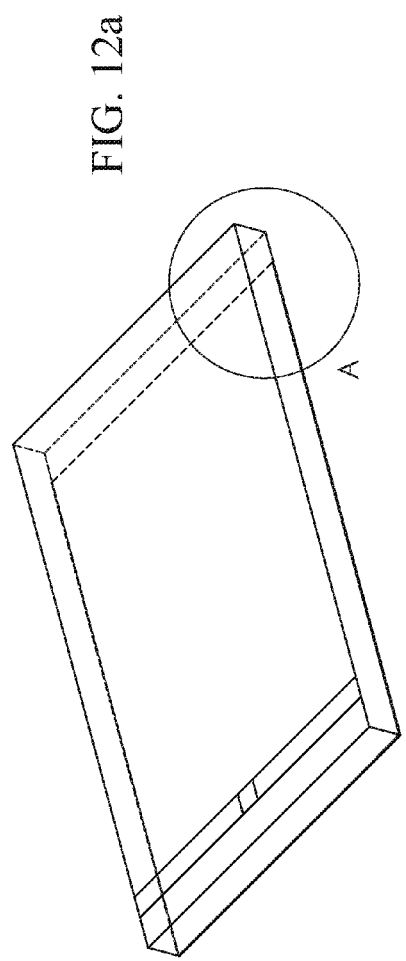
FIG. 12a illustrates a resonant circuit structure in accordance with still another embodiment of the present patent application.
Figure 12B:
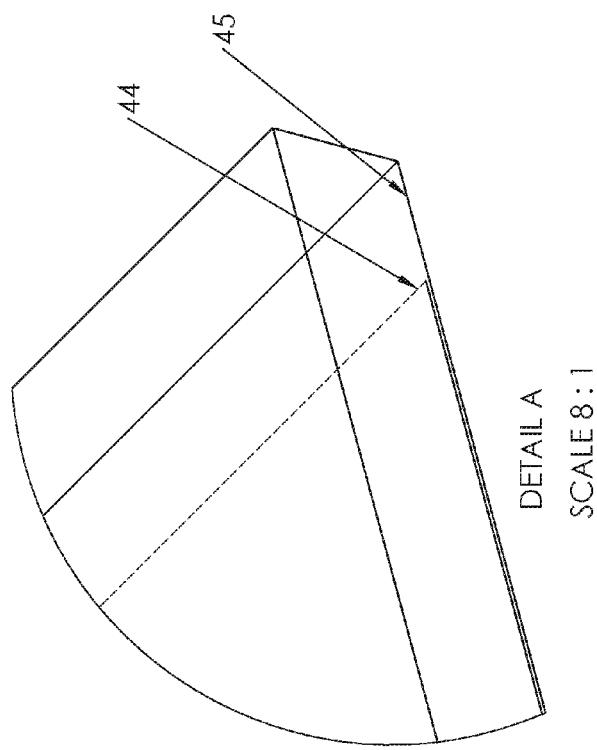

FIG. 12a illustrates a resonant circuit structure in accordance with still another embodiment of the present patent application. FIG. 12b is a partial magnified view of FIG. 12a. Referring to FIGS. 12a and 12b, the first and second conducting layers form a continuous conducting layer made of a conductive material. The continuous conducting layer is folded over the dielectric layer and the end portion 44 is over the start portion 45. It will be understood that the folded conducting layer formed a resonant circuit structure by the capacitive coupling between the end portion 44 and the start portion 45. The start portion and end portion of the continuous conducting layer can be any possible place on the first layer of dielectric layer, the second layer of dielectric layer, or side layer of dielectric layer.

Figure 13:
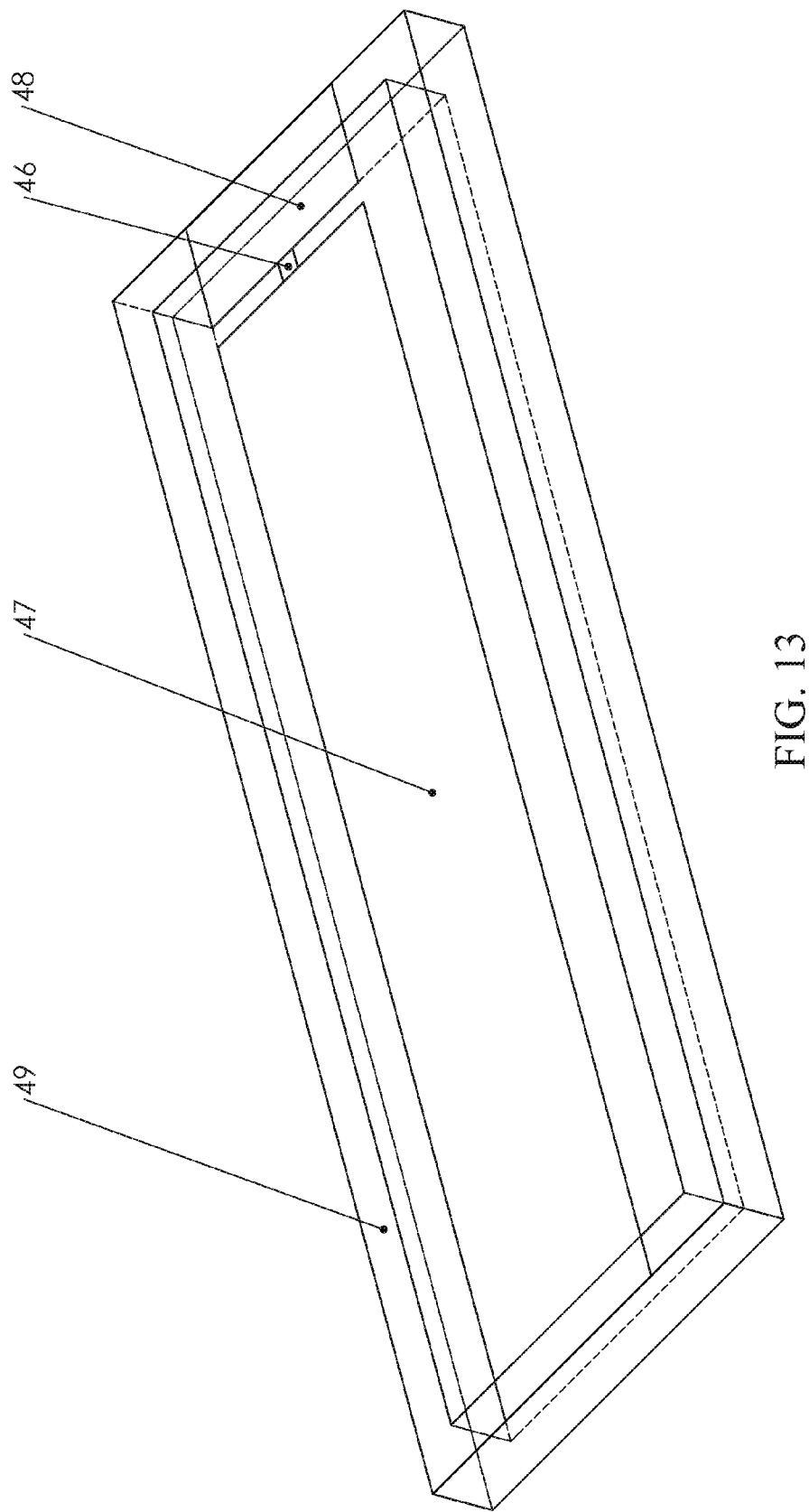
FIG. 13 shows a perspective view of an RF tag according to an embodiment of the present patent application.
Figure 14A:
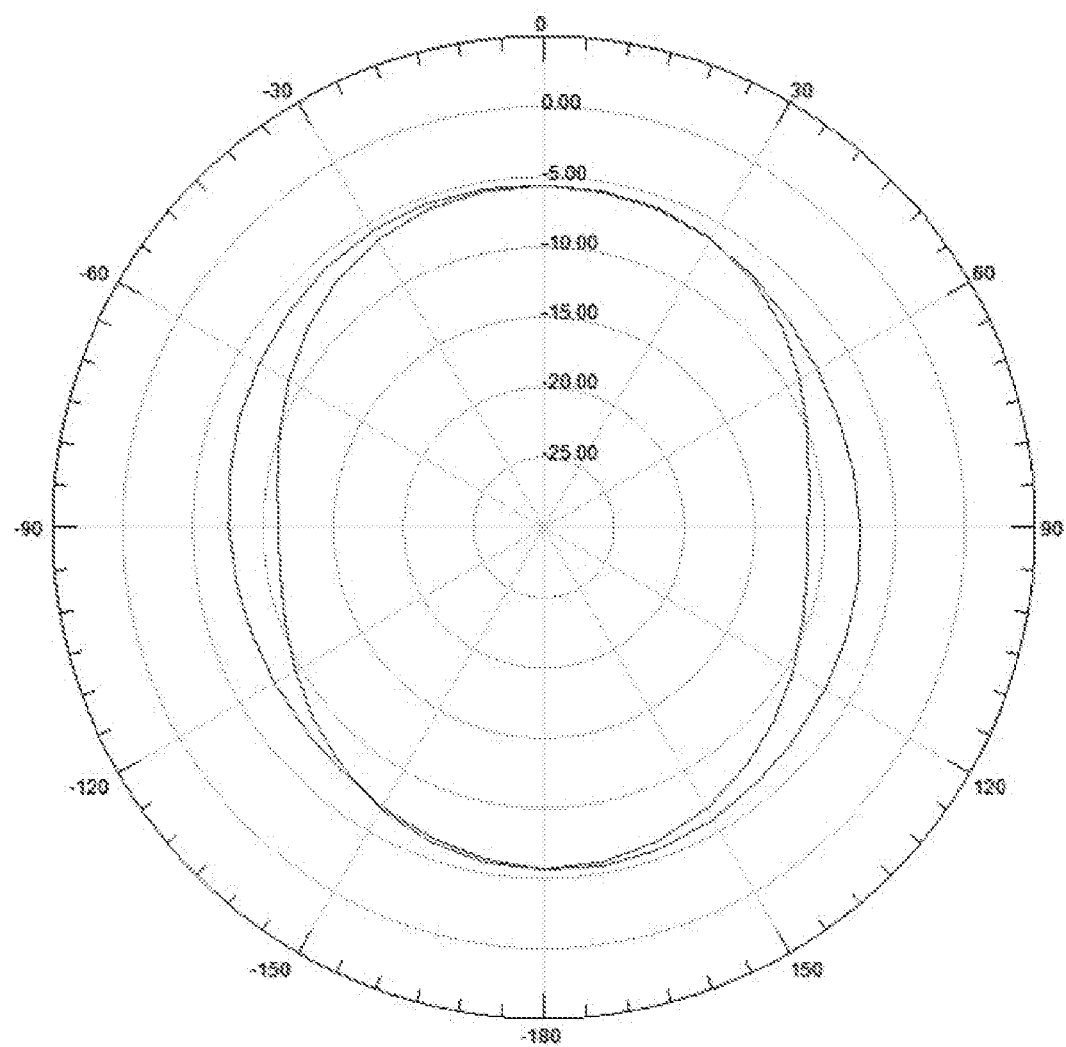
FIG. 14a shows the radiation gain pattern of the RF tag having the resonant circuit structure illustrated in FIG. 13 when placed on a metal surface.
Figure 14B:
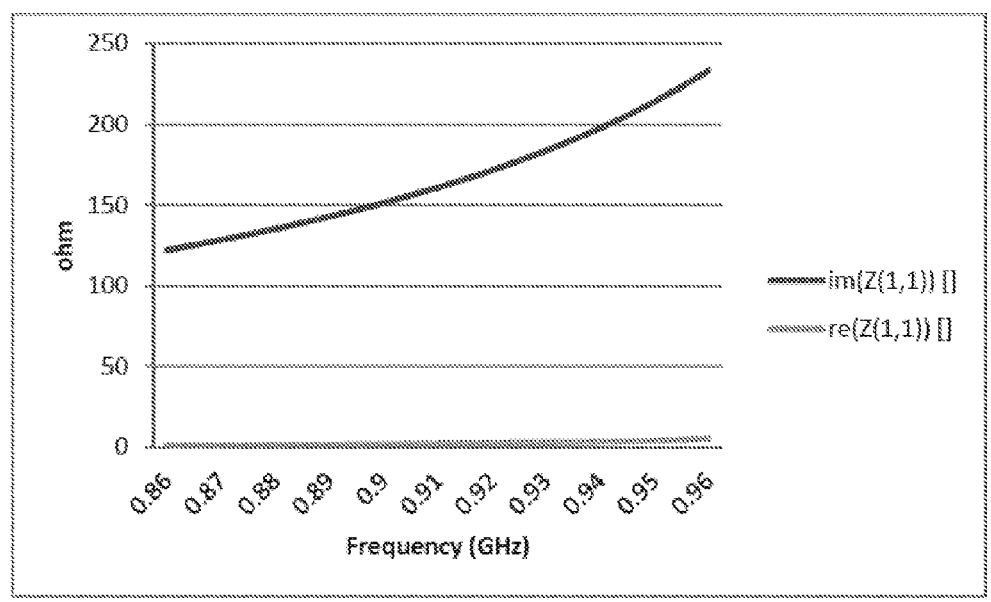
FIG. 14b shows the impedance pattern of the RF tag having the resonant circuit structure illustrated in FIG. 13 when placed on a metal surface.
Figure 14C:
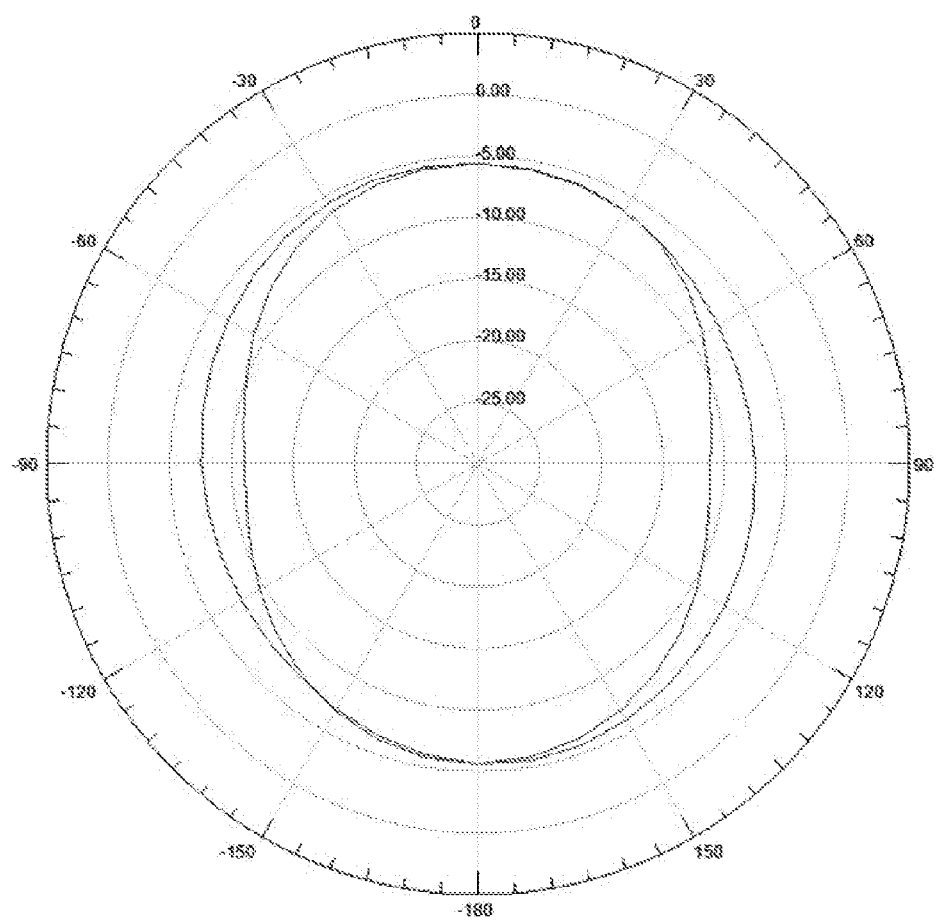
FIG. 14c shows the radiation gain pattern of the RF tag having the resonant circuit structure illustrated in FIG. 13 when placed off a metal surface.
Figure 14D:
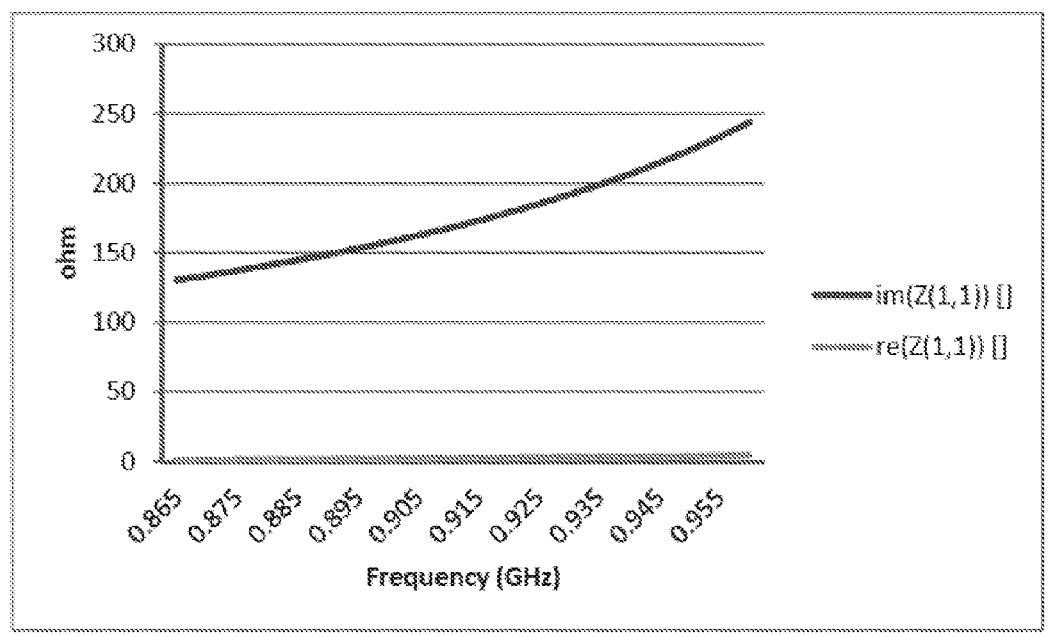
FIG. 14d shows the impedance pattern of the RF tag having the resonant circuit structure illustrated in FIG. 13 when placed off a metal surface.

FIG. 13 shows a perspective view of an RF tag according to an embodiment of the present patent application. FIG. 14a shows the radiation gain pattern of the RF tag having the resonant circuit structure illustrated in FIG. 13 when placed on a metal surface. FIG. 14b shows the impedance pattern of the RF tag having the resonant circuit structure illustrated in FIG. 13 when placed on a metal surface. FIG. 14c shows the radiation gain pattern of the RF tag having the resonant circuit structure illustrated in FIG. 13 when placed off a metal surface. FIG. 14d shows the impedance pattern of the RF tag having the resonant circuit structure illustrated in FIG. 13 when placed off a metal surface. Referring to FIG. 13, 49 is a metal frame. An RF tag includes two islands 47 and 48 and an RF device 46. The two islands 47 and 48 are electrically or non-electrically connected to the metal frame. In this embodiment, the islands' width is smaller than the metal frame's width. Since the metal frame has a much higher mechanical strength than the plastic frame, this kind of structure exhibits a higher mechanical strength and is better for usages in harsh environment.

Figure 15:
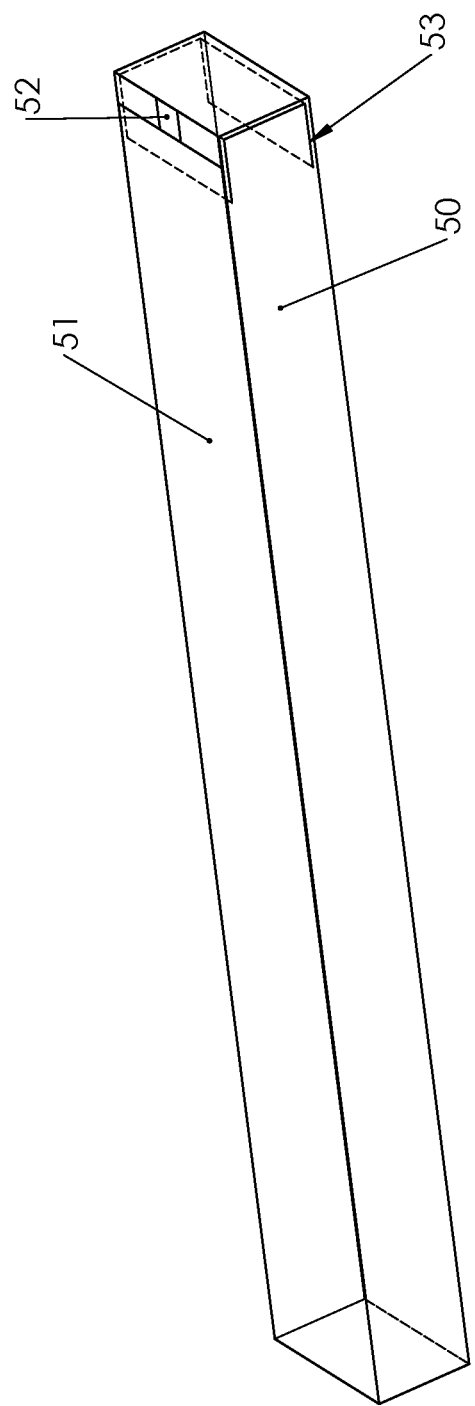
FIG. 15 shows a perspective view of an RF tag according to an embodiment of the present patent application.

FIG. 15 shows a perspective view of an RF tag according to an embodiment of the present patent application. Referring to FIG. 15, an additional conducting layer 53 is suspended between the first conducting layer 51 and the second conducting layer 50. More specifically, the additional conducting layer 53 is placed under the first conducting layer 51 and overlapping with both islands of the first conducting layer 51 and the second conducting layer 50. The RF device 52 is electrically connected to first conducting layer. The additional conducting layer 53 is electrically isolated from first conducting layer 51 and the second conducting layer 50. The additional conducting layer 53 can significantly reduce the size of RF tag because of large capacitance introduced.

Figure 16:
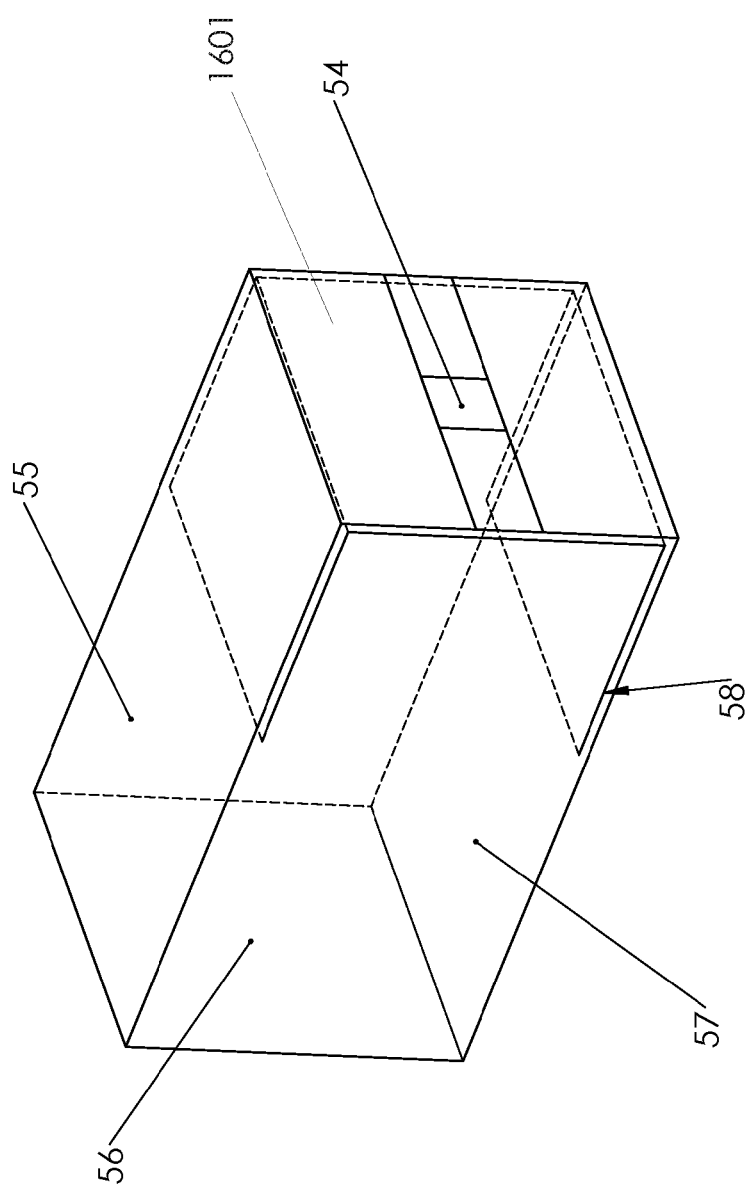
FIG. 16 shows a perspective view of an RF tag according to an embodiment of the present patent application.

FIG. 16 shows a perspective view of an RF tag according to an embodiment of the present patent application. Referring to FIG. 16, an additional conducting layer 58 is suspended between the first conducting layer 55 and the second conducting layer 57. More specifically, the additional conducting layer 58 is placed under the first conducting layer 55 and overlapping with both islands of the first conducting layer 55 and the second conducting layer 57. A slit is formed on the conducting base portion 1601, and the RF device 54 is disposed over the slit and electrically connected to the conducting base portion 1601. The other conducting base portion 56 is electrically connected to the first conducting layer and second conducting layer. The additional conducting layer 58 is electrically isolated from first conducting layer 55 and second conducting layer 57.

The RF tag with resonant circuit structure in which the resonant circuit structure's impedance is matched with RF device's impedance is specially designed to be attached on metallic surface, as shown in FIG. 1. It is also possible to create an RF tag with resonant circuit structure which exhibits balanced on/off metallic surface performance. In this resonant circuit structure, there are four conducting base portions connecting the first conducting layer 55 and the second conducting layer 57. The theory behind this structure is the same as that behind the former resonant structures but it does not only suppress the surface wave in the direction perpendicular to the two conducting base portions but also suppresses the surface wave in all directions. This allows the impedance of the resonant circuit structure to not change when placed on/off metallic surface.

It should be noted that throughout the specification and claims herein, when one element is said to be "coupled" to another, this does not necessarily mean that one element is fastened, secured, or otherwise attached to another element. Instead, the term "coupled" means that one element is either connected directly or indirectly to another element, or is in electrical communication with another element.

In the above-mentioned embodiments, the resonant circuit structure reduces electromagnetic induced surface waves on metallic surface, and preferably can enhance electric field strength at the RF device, enhance the electric field strength at the RF device module, or enhance the radiation efficiency of RF tags through capacitive coupling. Preferably, the embodiments may be applied in the applications of UHF or microwave RF tags.

While the present patent application has been shown and described with particular references to a number of embodiments thereof, it should be noted that various other changes or modifications may be made without departing from the scope of the present invention.

What is claimed is:

1. An RF tag comprising a resonant circuit structure and an RF device, the resonant circuit structure comprising:
   a first conducting layer;
   a second conducting layer spaced apart from the first conducting layer;
   at least one conducting base portion connecting one end of the first conducting layer and one end of the second conducting layer; and
   a layer of dielectric material inserted between the first conducting layer and the second conducting layer; wherein:

impedance of the resonant circuit structure is in match with impedance of the RF device;
a slit is formed on the first conducting layer;
the RF device is electrically coupled to the first conducting layer and disposed over the slit; and
the RF tag further comprises an RF device module being placed proximate to and capacitively coupled with the first conducting layer, wherein the RF device module comprises a first conducting island, a second conducting island, and the RF device.

2. The RF tag of claim 1 further comprising at least a magnetic material inserted between the first conducting layer and the second conducting layer.

3. The RF tag of claim 1, wherein the distance between the second conducting island and the first conducting layer is less than 0.1 mm.

4. The RF tag of claim 1 further comprising a third conducting layer capacitively coupled with resonant circuit structure and electrically connected to the second conducting layer by the conducting base portion, wherein the RF device is electrically connected to the third conducing layer.

5. The RF tag of claim 1 further comprising an additional conducting layer suspended between the first conducting layer and the second conducting layer.

6. The RF tag of claim 5, wherein the additional conducting layer is placed under the first conducting layer and overlapping with first conducting layer and the second conducting layer.

7. The RF tag of claim 5, wherein the additional conducting layer is electrically isolated from the first conducting layer and the second conducting layer.

8. The RF tag of claim 1, wherein the impedance of the resonant circuit structure is in conjugate match with the impedance of the RF device.

9. An RF tag comprising a resonant circuit structure and an RF device, the resonant circuit structure comprising:
a first conducting layer;
a second conducting layer spaced apart from the first conducting layer; and
a layer of dielectric material inserted between the first conducting layer and the second conducting layer; wherein:
impedance of the resonant circuit structure is in match with impedance of the RF device;
a slit is formed on the first conducting layer;
the RF device is electrically coupled to the first conducting layer and disposed over the slit;
the first conducting layer is connected to the second conducting layer by capacitive coupling; and
the first and second conducting layers form a continuous conducting layer made of a conductive material, and the continuous conducting layer is folded over the layer of dielectric material.

10. The RF tag of claim 9, wherein the RF device is placed over the resonant circuit structure spaced apart.

11. An RF tag comprising a resonant circuit structure and an RF device, the resonant circuit structure comprising:
a first conducting layer;
a second conducting layer spaced apart from the first conducting layer; and
at least one conducting base portion connecting one end of the first conducting layer and one end of the second conducting layer; wherein:
impedance of the resonant circuit structure is in match with impedance of the RF device;
the first conducting layer is connected to the second conducting layer by capacitive coupling;
the RF device is disposed on the conducting base portion and electrically coupled to the conducting base portion;
the RF tag further comprises an additional conducting layer suspended between the first conducting layer and the second conducting layer;
the RF tag comprises two conducting base portions; and
a slit is formed on one conducting base portion, and the RF device is disposed over the slit and electrically connected to the conducting base portion.

12. The RF tag of claim 11, wherein an RF device module is placed over the first conducting layer and the second conducting layer.

13. The RF tag of claim 11, wherein the additional conducting layer is placed under the first conducting layer and overlapping with first conducting layer and the second conducting layer.

14. The RF tag of claim 11, wherein the additional conducting layer is electrically isolated from the first conducting layer and the second conducting layer.

15. The RF tag of claim 11 further comprising a layer of dielectric material inserted between the first conducting layer and the second conducting layer.

* * * * *